US011856034B2

(12) United States Patent
Devaraj et al.

(10) Patent No.: US 11,856,034 B2
(45) Date of Patent: Dec. 26, 2023

(54) DYNAMIC VOICE OVER INTERNET PROTOCOL PROXY FOR NETWORK BANDWIDTH OPTIMIZATION

(71) Applicant: HEWLETT PACKARD ENTERPRISE DEVELOPMENT LP, Houston, TX (US)

(72) Inventors: Sasindran Devaraj, Bangalore (IN); Sindhura Madduri, Bangalore (IN); Mahesh Venkateshwaran, Bangalore (IN); Shravan Kumar Vuggrala, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 45 days.

(21) Appl. No.: 17/223,779

(22) Filed: Apr. 6, 2021

(65) Prior Publication Data

US 2022/0070229 A1 Mar. 3, 2022

(30) Foreign Application Priority Data

Sep. 1, 2020 (IN) .............................. 202041037666

(51) Int. Cl.
*H04M 3/00* (2006.01)
*H04M 5/00* (2006.01)
(Continued)

(52) U.S. Cl.
CPC ...... *H04L 65/1069* (2013.01); *H04L 65/1104* (2022.05); *H04M 7/0066* (2013.01); *H04M 7/0075* (2013.01)

(58) Field of Classification Search
CPC . H04L 63/0876; H04L 67/56; H04L 63/0281; H04L 65/40; H04L 61/2575;
(Continued)

(56) References Cited

U.S. PATENT DOCUMENTS 8,121,057 B1  2/2012 Botha et al.
8,161,159 B1 *  4/2012 Shetty ................... H04L 51/046
                                                    709/226
(Continued)

OTHER PUBLICATIONS

Smith et al., Optimizing your network for Skype for Business Online, Microsoft, available online at <https://docs.microsoft.com/en-us/skypeforbusiness/optimizing-your-network/optimizing-your-network>, May 6, 2021, 7 pages.
(Continued)

*Primary Examiner* — Kharye Pope
(74) *Attorney, Agent, or Firm* — Hewlett Packard Enterprise Patent Department

(57) ABSTRACT

Examples include receiving, from a VoIP server, identification information of the virtual meeting and information of a plurality of client devices participating in the virtual meeting, associating each client device of the plurality of client devices to a network device in a set of network devices based on the identification information of the virtual meeting and capabilities of the set of network devices, and creating a proxy agent in each network device in the set. The proxy agent is configured to receive, from the VoIP server, VoIP streaming data of the virtual meeting. Additionally, examples include, configuring the proxy agent to replicate and transmit the VoIP streaming data to the plurality of client devices.

20 Claims, 5 Drawing Sheets

(51) Int. Cl.
*H04L 12/66* (2006.01)
*H04L 65/1069* (2022.01)
*H04M 7/00* (2006.01)
*H04L 65/1104* (2022.01)

(58) Field of Classification Search
CPC ... H04L 41/12; H04L 67/306; H04L 65/1016; H04L 67/10; H04L 63/10; H04L 69/16; H04L 67/141; H04L 65/752; H04L 63/102; H04L 65/104; H04L 65/65; H04L 12/1818; H04L 61/106; H04L 65/1045; H04L 67/562; H04L 65/611; H04L 63/104; H04L 41/0897; H04M 7/006; H04M 7/128; H04M 3/42059; H04M 7/0075; H04M 1/2535; H04M 3/5191; H04M 3/56; H04M 3/567
USPC ....... 370/352, 235, 351, 356, 261, 252, 260, 370/355, 353, 902; 709/227, 203, 250, 709/219, 220, 204, 205, 231
See application file for complete search history.

(56) References Cited

U.S. PATENT DOCUMENTS

| | | | | |
|---|---|---|---|---|
| 8,503,340 | B1* | 8/2013 | Xu | H04W 84/12 370/310 |
| 8,982,173 | B1* | 3/2015 | Swanson | H04N 7/152 709/204 |
| 9,300,702 | B2 | 3/2016 | Zhou | |
| 9,538,134 | B2 | 1/2017 | Iltus | |
| 9,584,758 | B1* | 2/2017 | Chen | G10L 25/60 |
| 2003/0002481 | A1* | 1/2003 | Laursen | H04L 61/00 370/352 |
| 2006/0179110 | A1* | 8/2006 | Brown | H04N 7/15 709/204 |
| 2008/0095079 | A1* | 4/2008 | Barkley | H04L 67/61 370/260 |
| 2009/0024550 | A1* | 1/2009 | Wynn | H04W 12/069 707/E17.014 |
| 2010/0110910 | A1* | 5/2010 | Erceg | H04W 36/14 370/252 |
| 2013/0108033 | A1* | 5/2013 | Buzdugan | H04M 3/56 379/202.01 |
| 2013/0108034 | A1* | 5/2013 | Colbert | H04M 3/566 379/202.01 |
| 2014/0281707 | A1* | 9/2014 | Su | H04L 65/611 709/213 |
| 2015/0103991 | A1* | 4/2015 | Albert | H04M 3/56 379/202.01 |
| 2015/0237306 | A1* | 8/2015 | Feng | H04N 7/15 348/14.09 |
| 2015/0381680 | A1* | 12/2015 | Thornburgh | H04L 65/611 709/231 |
| 2017/0181114 | A1* | 6/2017 | Lu | H04W 60/00 |
| 2018/0131672 | A1* | 5/2018 | Ravindranath | H04L 61/255 |
| 2018/0368047 | A1* | 12/2018 | Patil | H04W 40/12 |
| 2020/0059497 | A1* | 2/2020 | Straub | H04L 65/102 |

OTHER PUBLICATIONS

Noworatzky, D., "How To Optimize Your WAN Connectivity for VoIP," TeleDynamics Think Tank, Aug. 28, 2019, http://info.teledynamics.com/blog/how-to-optimize-your-wan-connectivity-for-voip.

Mohideen, A. B. et al., "Cost Efficient Proxy-Based Real-Time Streaming System," International Journal of Innovation and Technology Management, Jan. 2012, http://www.ijimt.org/papers/302-Z3012.pdf.

* cited by examiner

DYNAMIC VOICE OVER INTERNET PROTOCOL PROXY FOR NETWORK BANDWIDTH OPTIMIZATION

BACKGROUND

Networks may include a plurality of resources connected by communication links, and may be used to connect people, provide services (e.g., internally and/or externally via the Internet and/or intranet), and/or organize information, among other activities associated with an entity. For instance, a network may include a variety of network devices, such as access points, controllers, gateways, switches, etc., which perform different network operations, such as network access, authentication, and routing network traffic to provide connectivity.

Different technologies enable delivery of voice communications and multimedia sessions over networks, such as the Internet. Technologies such as Voice over Internet Protocol (VoIP) allow transmission of voice and multimedia content over IP networks. VoIP endpoints include dedicated desktops, VoIP phones, software applications running on Personal computers and mobile devices, etc.

BRIEF DESCRIPTION OF THE DRAWINGS

The following detailed description references the drawings, wherein.

DETAILED DESCRIPTION

Figure 1:
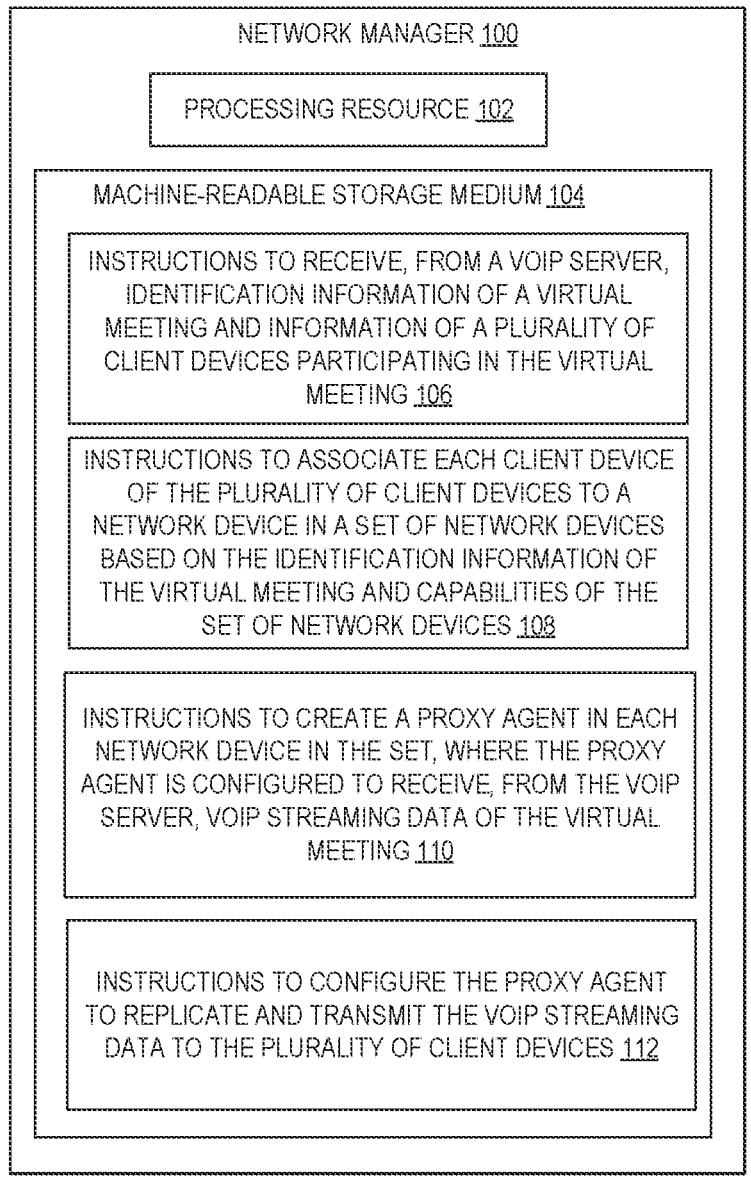
FIG. 1 is a block diagram of a network manager for organizing a virtual meeting over Voice over Internet Protocol, according to some examples.

A VoIP system generally includes a VoIP Server which helps in data processing and also answers incoming requests from client devices. The VoIP server may manage VoIP call routing between two or more VoIP endpoints (client devices, such as personal computers) and finds the best path to pass the pieces of information from one end to the other. The VoIP Server manages communication through various types of protocols by acting as an interface to bring interoperability between different types of protocols and also manages the client devices using VoIP. The VoIP server may also enable other functions such as video conferencing, Interactive Voice Response (IVR), set call forwarding, anonymous call rejection, blacklist, call return, call waiting, caller ID, caller ID blocking, etc.

The VoIP server receives requests from client devices and through various processes and assists in establishment of an Internet Protocol (IP) phone system. When the VoIP server receives a request message from a client device inviting another client device to join a session, the VoIP server forwards this invitation to the other client device. Generally, VoIP traffic, such as in virtual meetings, conference calls, etc. involves each client device individually interacting with the VoIP server over a Wide Area Network network (WAN). In a virtual meeting, the presenter sends upstream traffic (such as voice/video/desktop sharing) to the VoIP Server. VoIP Server replicates this traffic and streams it to all the other attendees' (client devices) which are part of the virtual meeting. Traffic sent from VoIP Server to all other meeting attendees is called downstream traffic. Thus, if 1000 attendees from the same branch office are connected to the virtual meeting, 1000 copies of the same downstream traffic is sent to the 1000 different client devices over the WAN thereby consuming huge WAN bandwidth. As the number of client devices increases, WAN bandwidth consumption increases which may be inefficient and expensive. Since, multiple identical copies of downstream traffic is streamed from the VoIP server to the individual client devices over the WAN, wasteful consumption of WAN bandwidth occurs.

Examples disclosed herein address these technological issues by dynamically associating client devices interested in identical downstream VoIP traffic to one or more network device(s) (such as Access Points or Controllers) and creating a proxy agent on the network devices, where the proxy agent is to receive the downstream VoIP traffic over the WAN on behalf of all locally connected devices interested in same downstream traffic. Thus, instead of sending the downstream traffic to each of the client devices, the VOIP Server may send the downstream traffic to the network device. The network device receives the downstream VoIP traffic, where the proxy agent in the network device(s) can replicate and transmit the downstream VoIP traffic to the locally connected clients over Wireless Local Area Network (WLAN), consequently reducing WAN bandwidth consumption.

In an example, organizing a virtual meeting over VoIP is described. A network manager receives identification information of the virtual meeting and information of a plurality of client devices participating in the virtual meeting from a VoIP server. In an example, the network manager is a cloud-based network management system. Each client device of the plurality of client devices is associated to a network device in a set of network devices based on the identification information of the virtual meeting and capabilities of the set of network devices. A proxy agent is created in each network device in the set, where the proxy agent is configured to receive, from the VoIP server, VoIP streaming data of the virtual meeting. The proxy agent is configured to replicate and transmit the VoIP streaming data to the plurality of client devices.

In this manner, since the downstream VoIP traffic is sent to the network device over WAN and the network device in turn replicates and transmits the downstream VoIP traffic to connected client devices over WLAN, it facilitates to avoid forwarding copies of the downstream VoIP traffic individually to each of the client devices participating in the virtual meeting. This enables reduction of VoIP traffic transmitted over WAN and thereby reduces consumption of WAN bandwidth and enhances network availability.

Referring now to the drawings, FIG. 1 is a block diagram of an example network manager 100 for organizing a virtual meeting over VoIP. Network manager 100, as used herein, may gather network operating information from various nodes of one or more networks, including network traffic load information, network topology information, network usage information, etc. Furthermore, network manager 100 may transmit commands to various nodes of the one or more networks to alter network topology and routing to achieve various network efficiency and efficacy goals. It will be understood by one of ordinary skill in the art that network manager 100 may comprise any suitable type(s) of computing device(s) for facilitating a virtual meeting over VoIP. Moreover, the network manager 100 may comprise one or more cloud-based resources (e.g., a cloud server). Moreover, network manager 100 may include any necessary hardware components to perform the inventions disclosed herein, including, but not limited to: processors, memories, display devices, input devices, communications equipment, etc.

In the example of FIG. 1, network manager 100 may be a cloud-based network management system for real-time management of wireless, WAN, and wired networks with WAPs, gateways, and switches. The cloud-based network manager may be involved in monitoring, configuration, client troubleshooting, role detection, guest management, reports and application usage. Multiple clusters of network devices may be monitored and managed by the network manager 100. In some examples, the network manager 100 may be implemented in a Software-as-a-Service (SaaS) platform. Along with device and network management functions, the network manager 100 may offer value-added services such as customized guest access, client presence, service assurance analytics, network inventory management, subscriptions, user access and other functions. The network manager 100 can also provision tenant accounts, allocate devices, assign subscriptions, and monitor tenant accounts. The network manager 100 also allows administrators to look into a specific tenant account and perform additional administration and configuration tasks.

Network manager 100 includes a processing resource 102 and a machine-readable storage medium 104. Machine-readable storage medium 104 may be in the form of non-transitory machine-readable storage medium, such as suitable electronic, magnetic, optical, or other physical storage apparatus to contain or store information such as instructions 106, 108, 110, 112, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 106, 108, 110, and 112 are stored (encoded) on storage medium 104 and are executable by processing resource 101 to implement functionalities described herein in relation to FIG. 1. In some examples, storage medium 110 may include additional instructions, like, for example, the instructions to implement some of the functionalities described in relation to network manager 100 in FIG. 2A or computing device 400 in FIG. 4. In other examples, the functionalities of any of the instructions of storage medium 104 may be implemented in the form of electronic circuitry, in the form of executable instructions encoded on machine-readable storage medium, or a combination thereof.

Processing resource 102 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 106, 108, 110, and 112 as described herein.

Instructions 106 may be executable by processing resource 102 to receive identification information of a virtual meeting and information of a plurality of client devices participating in the virtual meeting. In an example, the client device is a computing device that is connected to a network device e.g. an access point (AP), managed by the network manager 100. In some examples, the computing device may be a laptop or a smart phone running an application for connecting to the virtual meeting over VoIP. The virtual meeting may be hosted by a VoIP server and the plurality of client devices may have access to the virtual meeting. In an example, the client devices may be authenticated by the VoIP server based on credentials of the client devices to allow access to the virtual meeting. The credentials may include a meeting ID and a password. In an example, the virtual meeting may be created by a user of any of the client devices. Based on inputs provided by the user, a hyperlink to the virtual meeting may be created by the VoIP server. The hyperlink may be distributed via the VoIP server to other client devices in order to provide access to the virtual meeting. A meeting ID and password associated with the virtual meeting may also be sent to the client devices along with the hyperlink. Identification information of the virtual meeting may include the meeting ID. Once the client devices connect to the virtual meeting, the VoIP server may store a Media Access Control (MAC) address and/or an IP address of the client devices connecting to the virtual meeting. The information of the plurality of client devices participating in the virtual meeting includes the MAC and/or IP addresses of the client devices connecting to the virtual meeting which is gathered by the VoIP server. In an example, the VoIP server may send the identification information of the virtual meeting and the information of plurality of client devices participating in the virtual meeting to the network manager 100.

Instructions 108 may be executable by processing resource 102 to associate each client device of the plurality of client devices to a network device in a set of network devices based on the identification information of the virtual meeting and capabilities of the set of network devices. In an example, associating a client device with a network device in the set includes wirelessly connecting the client device to the network device, such that the network device provides network connectivity services to the client device. In an example, the capabilities include hardware capabilities of the network devices. The set of network devices may be selected based on hardware capabilities, such as firmware version, model no., type no., etc. Capabilities of the network devices may also include client handling capacity and processing load. In an example, the client devices participating in the same virtual meeting may be redistributed to connect to the same network device. For instance, when 50 client devices which are by default connected to three different APs participate in a virtual meeting, instructions 108 may be executable by processing resource 102 to associate all the 50 client devices to a single AP. Based on the identification information of the virtual meeting (such as meeting ID), the client devices connected to the same meeting ID may be identified by the network manager 100. The client devices participating in the same virtual meeting are then rearranged to connect to one or more network devices in the set based on client handling capacity of the network devices.

Instructions 110 may be executable by processing resource 102 to create a proxy agent in each network device in the set. In an example, the proxy agent includes a set of instructions which programs a network device, such as an AP, WLAN controller, a gateway, etc. to receive streaming data and replicate the same. The proxy agent may receive, replicate, and relay streams of media, such as Real-time transport Protocol (RTP) traffic streams over User Datagram Protocol (UDP). The proxy agent may also provide Network Address Translation (NAT) capability for media streams received from the VoIP server. Thus, the network device(s) in the set may function as a single device or set of devices between the Internet (or public network) and a local network (or private network). Thus, in an instance, a single unique IP address, that of the network device, is required to represent the plurality of client devices to network resources outside the local network. The network device in the set is configured to receive, from the VoIP server, VoIP streaming data of the virtual meeting on behalf of the plurality of client devices connected to the network device.

Instructions 112 may be executable by processing resource 102 to configure the proxy agent to replicate and transmit the VoIP streaming data to the plurality of client devices associated with respective network devices in the set. As used herein, "configuring" the proxy agent refers to enabling the proxy agent with functionalities, tools, and Application Programming Interfaces (APIs) based on which the proxy agent can perform replication of the VoIP streaming data and transmit the same to the client devices. In an example, the network manager 100 may provide information of the plurality of client devices participating in the virtual meeting to the proxy agent. The information of the plurality of client devices may include a MAC address of the client devices. On receiving the VoIP streaming data of the virtual meeting, the proxy agent may create copies of the VoIP streaming data for the client devices. The number of copies of the VoIP streaming data is equal to the number of client devices associated with the network device and participating in the virtual meeting. Each of the copies of the VoIP streaming data is transmitted to client devices associated with the network device.

Accordingly, this allows for conservation of WAN bandwidth without adversely affecting the quality of the virtual meeting over VoIP. This is because a single copy of VoIP streaming data from the VoIP server is transmitted to a network device which receives the VoIP streaming data on behalf of the multiple client devices associated with it, instead of multiple copies of VoIP streaming data from the VoIP server that would have been transmitted directly over WAN to each of the multiple client devices. This allows reduction in the number of copies of the VoIP streaming data that is transmitted over the WAN thereby reducing consumption of WAN bandwidth.

Figure 2A:
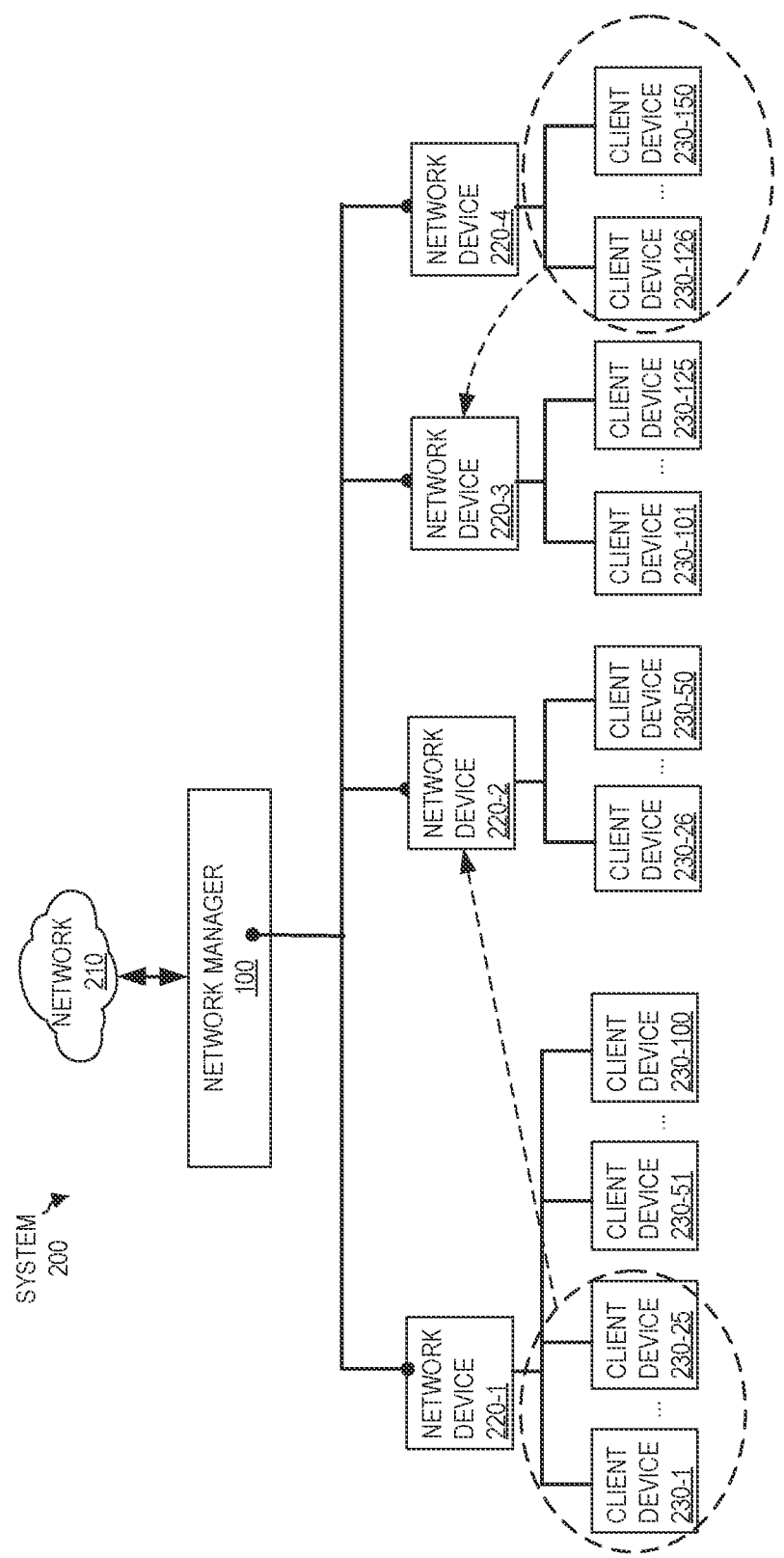
FIG. 2A illustrates a block diagram of a system 200 for organizing a virtual meeting over Voice over Internet Protocol, according to some examples.
Figure 4:
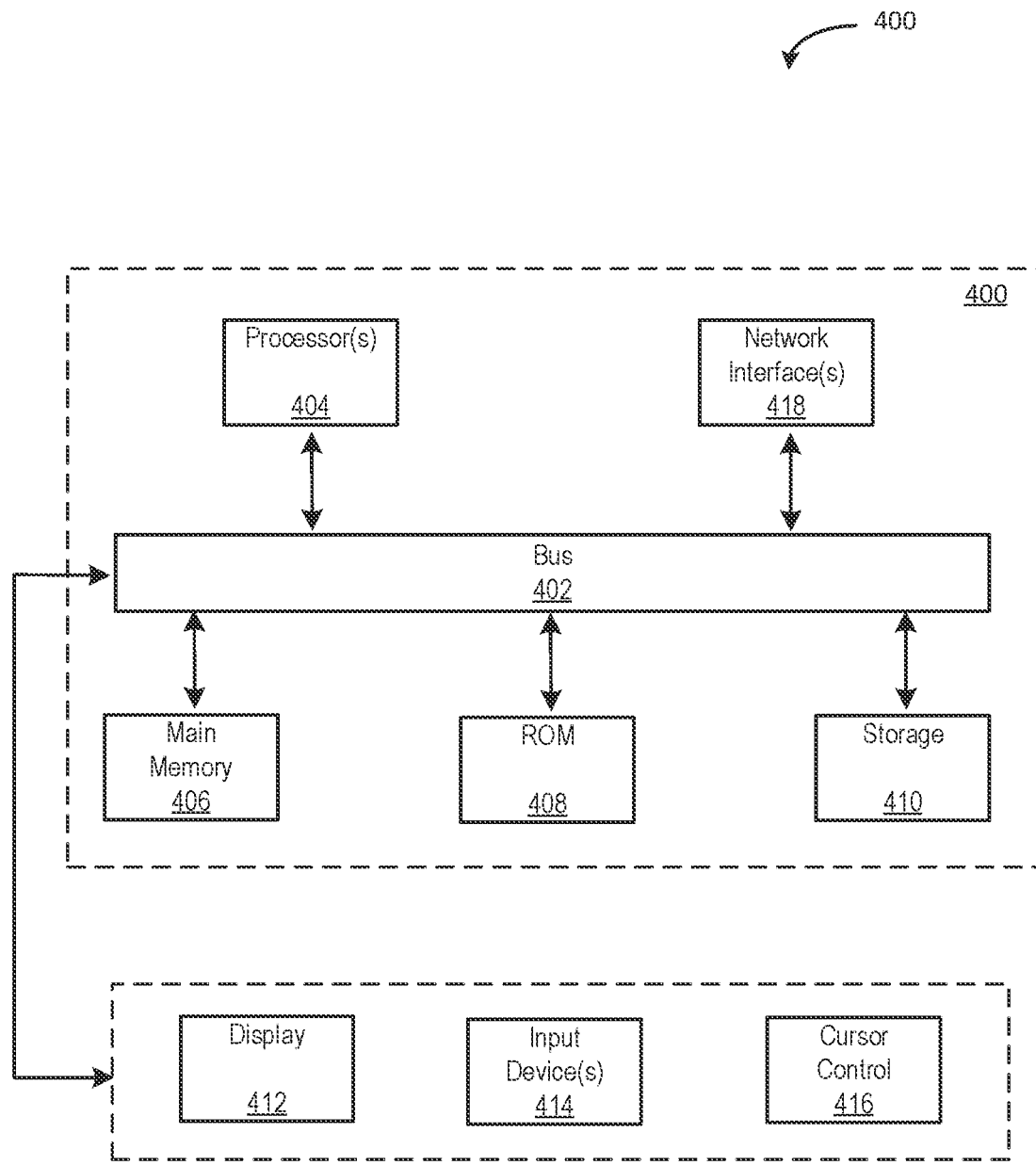
FIG. 4 depicts a block diagram of a computer system in which the embodiments described herein may be implemented, according to some examples.

Network manager 100 of FIG. 1, which is described in terms of processors and machine-readable storage mediums, can include one or more structural or functional aspects of network manager 100 of FIG. 2A, or computer system 400 of FIG. 4.

FIG. 2A is a block diagram of an example system 200 for organizing a virtual meeting over VoIP. System 200 may include network manager 100, as described above in relation to FIG. 1. System 200 may comprise a network 210, wherein network manager 100 is connected to network 210. In some examples, network 210 is a software defined network (SDN). Network 210 may comprise one or more LANs, VLANs, WLANs, virtual private networks (VPNs), WANs, the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, network 210 may comprise one or more cellular networks using one or more mobile communications standards (e.g., 3G, 4G, 5G, etc.). It will be understood by one skilled in the art that system 200 may comprise any suitable type(s) of network(s), now known or later developed. In an example, the network manager 100 may be implemented on cloud-based resources deployed in the network 210.

System 200 may comprise a plurality of network devices 220-1 to 220-4 connected to network manager 100. Each of network devices 220-1 to 220-4 may comprise a managed switch (i.e., switches managed by network manager 100) or managed wireless access point (WAP) (i.e., WAPs managed by network manager 100) which supports data link layer switching (i.e., Layer 2 switching), IP layer routing (i.e., Layer 3 routing), or a combination thereof. Moreover, each of network devices 220-1 to 220-4 may comprise stackable or standalone type switches, power over Ethernet (PoE) or non-PoE type switches, modular or fixed configuration (i.e. fixed configuration Ethernet) type switches, etc. It will be understood by one skill in the art that each of network devices 220-1 to 220-4 may be any suitable type(s) of access points or switches. In an example, the network devices 220-1 to 220-4 may be part of a network device duster managed by a duster manager. In an example, the duster manager may be deployed in one of the network devices 220-1 to 220-4. The network devices 220-1 to 220-4 may also be managed by the duster manager in combination with the network manager 100.

System 200 may comprise client devices 230-1 to 230-150, collectively referred to as client devices 230. The client devices 230 are connected to one of the network devices 220-1 to 220-4 via a communication link (e.g., wired or wireless, direct or indirect, etc.). In examples described herein, a "link" may include a combination of hardware (e.g., communications interfaces, communication links, etc.) and instructions (e.g., executable by a processing resource) to communicate (e.g., receive, send, etc.) with an external resource (access point, switch, gateway, controller, etc.) connected to the network. The client devices 230 may be capable to organize and participate in a virtual meeting. Examples of client devices may include: desktop computers, laptop computers, mainframes, tablet computers, e-readers, netbook computers, televisions and similar monitors (e.g., smart TVs), content receivers, set-top boxes, personal digital assistants (PDAs), mobile phones, smart phones, smart terminals, virtual terminals, video game consoles, virtual assistants, Internet of things (IoT) devices, and the like.

As shown in FIG. 2A, client devices 230-1 to 230-25 and 230-51 to 230-100 are associated with network device 220-1, client devices 230-26 to 230-50 are associated with network device 220-2, client devices 230-101 to 230-125 are associated with network device 220-3, and client devices 230-126 to 230-150 are associated with network device 220-4. Network devices 220-1 to 220-4 provide network access and routing of traffic to respective client devices associated with them.

Consider that client device 230-1 has set up a virtual meeting. Client devices 230-1 to 230-50 and client devices 230-100 to 230-150 have received a link to join the virtual meeting. The virtual meeting may be hosted by a VoIP server (not shown in FIG. 2A). The VoIP server may host VoIP calling, video conferencing, or like services in the network 210 and may connect to the client devices 230 over WAN. Once the virtual meeting is initiated, client devices 230-1 to 230-50 and client devices 230-100 to 230-150 may participate the virtual meeting by following the link.

The network manager 100 may receive identification information of the virtual meeting and information of client devices 230-1 to 230-50 and client devices 230-100 to 230-150 participating in the virtual meeting, from the VoIP sever. In an example, the network manager 100 may extract a meeting ID corresponding to the virtual meeting and MAC or IP address of the client devices participating in the virtual meeting from the VoIP server.

The network manager 100 may select a set of network devices based on a total number of the plurality of client devices 230-1 to 230-50 and 230-101 to 230-150 and a maximum number of client devices that can connect to each of the set of network devices. Referring to FIG. 2A, consider that each of the network devices 220-1 to 220-4 has capability to serve 50 client devices. In the example of FIG. 2A, there are 100 client devices participating in the virtual meeting. Thus, the network manager 100 may determine that at least two network devices are required to serve the 100 client devices, 230-1 to 230-50 and 230-101 to 230-150, participating in the virtual meeting. While FIG. 2A shows 100 client devices participating in the virtual meeting, in other examples, more than 100 or less than 100 client devices may participate. In an example, the network manager 100 may select the network devices 220-2 and 220-3 as the set of network devices to associate with the client devices participating in the virtual meeting. The selection of the network devices 220-2 and 220-3 may be based on capabilities of the network devices 220-1 through 220-4. Capabilities of the network devices may include hardware capabilities, such as firmware version, model no., type no., etc. . . . Capabilities of the network devices may also include client handling capacity based on the number of clients previously connected to the network device and processing load dependent on the amount of traffic passing through the network device. In an example, the network devices 220-2 and 220-3 may be selected by using load balancing techniques on the network devices 220 in the cluster. Although in FIG. 2A network devices 220-2 and 220-3 are selected for associating with the client devices participating in the virtual meeting, in an example, any other network devices in the cluster may be selected.

Figure 2B:
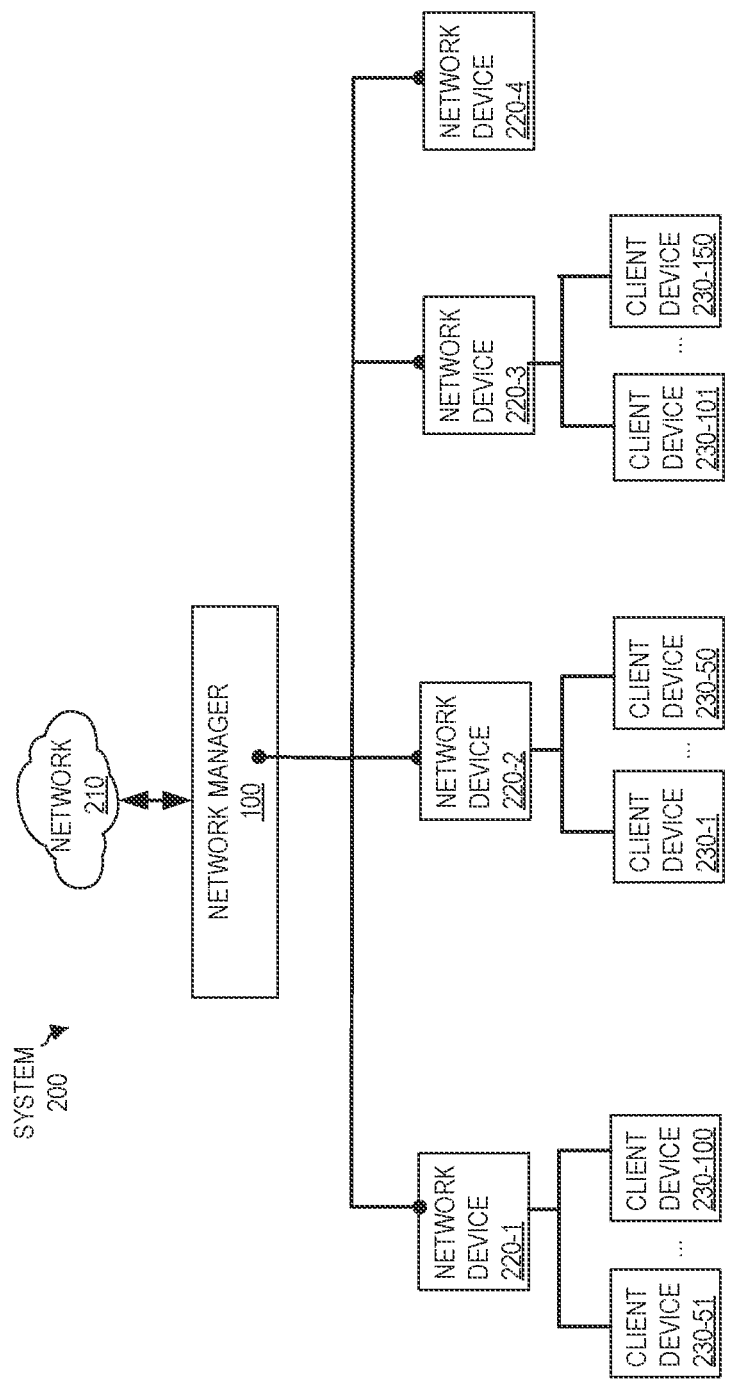
FIG. 2B continues the block diagram of system 200 shown in FIG. 2A, according to some examples.

In an example, associating the client device to the network device in the set includes moving client devices from being supported (connected) by one network device to being supported by another network device. For example, this would include moving the client devices 230-1 to 230-25 from network device 220-1 to connect to network device 220-2 and moving the client devices 230-126 to 230-150 to connect to network device 220-3 from network device 220-4. Thus, the client devices 230-1 to 230-50 and client devices 230-101 to 230-150 are distributed between the set of network devices 220-2 and 220-3, as illustrated in FIG. 2B. Further, associating the client devices 230-1 to 230-50 to network device 220-2 may include mapping a MAC address of each of the plurality of the client devices 230-1 to 230-50 to an IP address of the network device 220-2. Additionally, associating the client devices 230-101 to 230-150 to network device 220-3 may include mapping a MAC address of each of the plurality of the client devices 230-101 to 230-150 to an IP address of the network device 220-3. Thus, associating the plurality of client devices with the set of network devices includes mapping MAC address of each of the plurality of the client devices to an IP address of respective network devices in the set. In an example, a mapping table may be created, such that MAC addresses of client devices 230-1 to 230-50 and 230-101 to 230-150 corresponding to IP addresses of the network devices 220-2 and 220-3, respectively.

In an example, the network manager 100 may send to the VoIP server, information indicative of the associations between the plurality of client devices and respective network devices in the set. In an example, the network manager 100 may send information indicative of the association between the client devices 230-1 to 230-50 and the network device 220-2, as shown in FIG. 2B, to the VoIP server. In an example, the information indicative of the association may include a table that links MAC addresses of the client devices 230-1 to 230-50 to an IP address of the network device 220-2. Likewise, the network manager 100 may send information indicative of the association between the client devices 230-101 to 230-150 and the network device 220-3 to the VoIP server. The VoIP server may store this information indicative of association between client devices and respective network devices, based on which the VoIP server may send downstream VoIP traffic to the respective network devices, 220-2 and 220-3, associated with the client devices 230-1 to 230-50 and 230-101 to 230-150 participating in the virtual meeting.

The network manager 100 creates a proxy agent in each of the set of network devices 220-2 and 220-3 associated with the client devices participating in the virtual meeting. In an example, the proxy agent includes instructions and APIs for receiving media streams from the VoIP server. The proxy agent may be configured to receive, from the VoIP server, VoIP streaming data of the virtual meeting. Since, the information indicative of association between client devices and respective network devices is shared with the VoIP server, the VoIP server may send the VoIP traffic to the respective network devices. In an example, creating the proxy agent includes associating the proxy agent with the virtual meeting based on the identification information of the virtual meeting. Associating the proxy agent with the virtual meeting includes, in an example, linking the proxy agent with the virtual meeting using the meeting ID, such that when VoIP traffic is received from the VoIP server, the proxy agent identifies the VoIP traffic of the virtual meeting based on the meeting ID. In an example, the set of network devices 220-2 and 220-3 may receive the identification of the virtual meeting, such as a meeting ID from the network manager 100 and associate the same with respective proxy agents created in the network devices 220-2 and 220-3 in the set. Based on the meeting ID, the proxy agent may also identify the client devices participating in the meeting ID.

In an example, a presenter, say client device 230-1, in the virtual meeting may send information to the VoIP server. The VoIP server may send the presented information to the set of network devices 230-2 and 230-3 which receive the VoIP streaming data from the VoIP server on behalf of the client devices 220-1 to 220-50 and 220-101 to 220-150, respectively. The proxy agent created in the network device 230-2 may receive the presented information from the VoIP server on behalf of the client devices 220-1 to 220-50 locally connected with network device 230-2. In an example, the proxy agent created in the network device 230-3 may receive the presented information from the VoIP server on behalf of the client devices 220-101 to 220-150 locally connected with network device 230-3.

The network manager 100 may configure the proxy agent in each of the set of network devices 220-2 and 220-3 to replicate and transmit the VoIP streaming data to the plurality of client devices 230-1 to 230-50 and 230-101 to 230-150 associated with respective network devices in the set. The proxy agent created in the network device 220-2 associated with the virtual meeting may be configured to replicate and transmit the VoIP streaming data to client devices 230-1 to 230-50. The proxy agent created in the network device 220-3 associated with the virtual meeting may be configured to replicate and transmit the VoIP streaming data to client devices 230-101 to 230-150. In an example, the proxy agent in the network device 220-2 may create a copy of the VoIP streaming data for each of the client devices 230-1 to 230-50. The proxy agent in the network device 220-3 may create a copy of the VoIP streaming data for each of the client devices 230-101 to 230-150. Thus, one copy of the presented information may be shared from the VoIP server to the network devices 220-2 and 220-3 each and proxy agents in the network devices 220-2 and 220-3 may create copies of the presented information and distribute the same among the clients 230-1 to 230-50 and 230-101 to 230-150. Since, the number of copies transmitted by the VoIP server over WAN is two directed to the network devices 220-2 and 220-3, instead of 100 copies for each of the participating client devices, WAN bandwidth consumption is reduced and network availability is increased.

Once the virtual meeting ends, the proxy agent in each of the set of network devices 220-2 and 220-3 is terminated. In an example, the virtual meeting may be set up for a predefined time duration. Alternatively, the client device 230-1 may trigger an input to end the virtual meeting. Once, the time duration has passed or the client device 230-1 has triggered the input to end the virtual meeting to the VoIP server, the VoIP server may send an indication to the network manager 100 that the virtual meeting has ended. In response to receiving, from the VoIP server, an indication that the virtual meeting has ended, the network manager 100 terminates the proxy agent in each of the set of network devices 220-2 and 220-3. Thus, the proxy agent is dynamically created in the set of network devices at the start of the virtual meeting and is terminated once the virtual meeting is over, consequently avoiding permanent hardware resource consumption in the network device.

In an example, consider that client devices 230-2 and 230-4 disconnects from the virtual meeting. The network manager 100 may identify that client devices 230-2 and 230-4 has dropped off or is no longer connected to the network device 220-2. Based on this identification, the network manager 100 may update the information of the plurality of client devices participating in the virtual meeting and share the updated information with the proxy agent in the network device 220-2. The proxy agent in the network device 220-2, may replicate the downstream data from the VoIP server and transmit the same, based on the updated information of the plurality of client devices participating in the virtual meeting. Further, in case new client devices join the virtual meeting, the network manager may update the information of the plurality of client devices participating in the virtual meeting, Based on the updated information, the plurality of clients may be associated with a set of network devices and proxy agent(s) may be created and configured based on the updated information. The network manager 100 updates in real-time, the information of the plurality of client devices participating in the virtual meeting.

Figure 3:
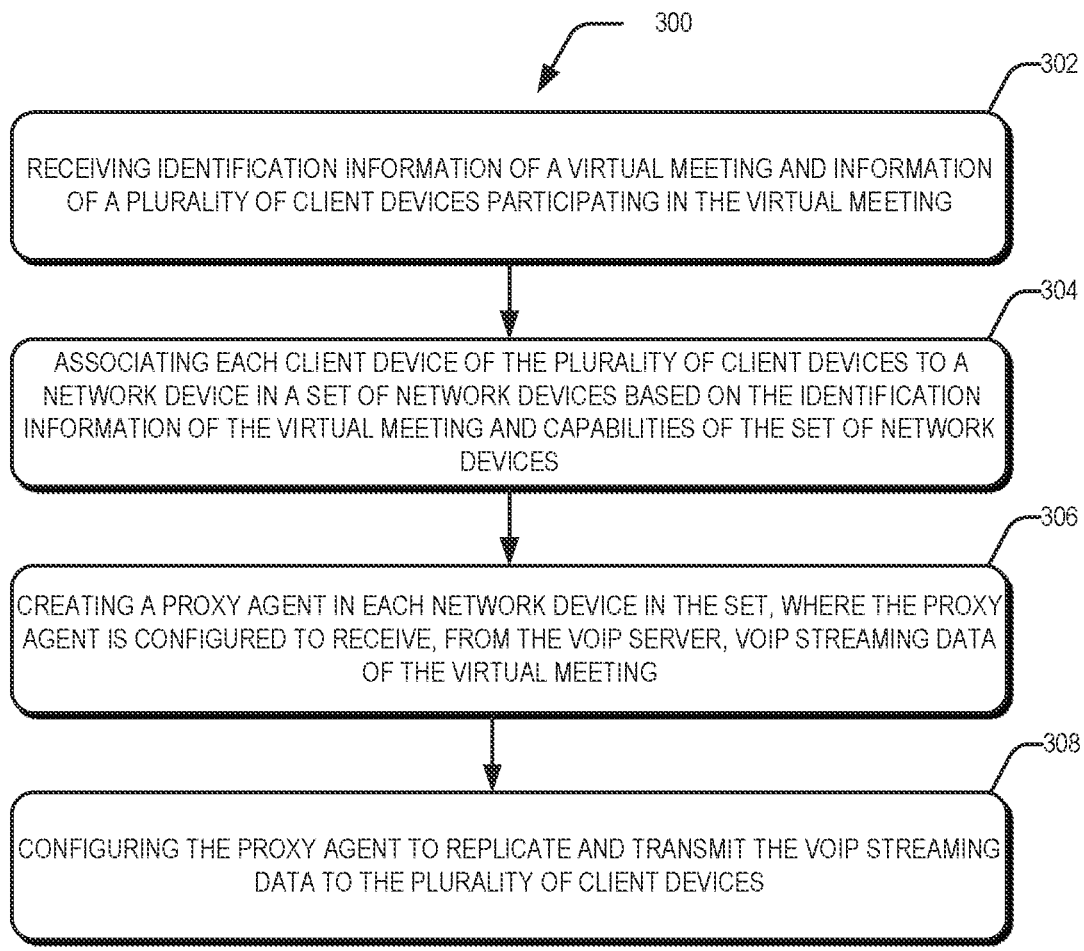
FIG. 3 illustrates a flowchart for a method to organize a virtual meeting over Voice over Internet Protocol, according to some examples.

FIG. 3 illustrates a flowchart for a method 300 to organize a virtual meeting over VoIP. Method 300 may be executed as one or more instructions on a machine (e.g., by at least one processor), where the one or more instructions are included on at least one machine-readable storage medium (e.g., a non-transitory machine readable-storage medium.) While only four blocks are shown in method 400, method 400 may include other actions described herein. Additionally, although the blocks are shown in an order, blocks depicted in FIG. 3, may be performed in any order and at any time. Also, some of the blocks shown in method 300 may be omitted without departing from the spirit and scope of this disclosure. Method 300 may be implemented on a network manager according to any of the examples herein.

At block 302, a network manager, such as the network manager 100 of FIG. 1, may receive identification information of a virtual meeting and information of a plurality of client devices participating in the virtual meeting. In an example, the client device is a computing device that is connected to a network device, such as an AP managed by the network manager. In some examples, the computing device may be a laptop or a smart phone running an application for connecting to the virtual meeting over VoIP.

At block 304, the plurality of client devices is associated to a set of network devices based on the identification information and capabilities of the set of network devices. In an example, the client devices participating in the same virtual meeting are connected to the same network device. The set of network devices may be part of a network device cluster. In an example, the set of network devices are selected based on a total number of the plurality of client devices and a maximum number of client devices that can connect to each of the set of network devices. Media Access Control (MAC) address of each of the plurality of the client devices are mapped to an IP address of respective network devices in the set. Further, information, such as a mapping table, indicative of the association between the plurality of client devices and respective network devices in the set may be sent to the VoIP server.

At block 306, a proxy agent is created in each of the set of network devices. In an example, the proxy agent includes functionalities and instructions to receive media stream from the VoIP server and to replicate and distribute the replicated media streams to network devices. In an example, the proxy agent may also include network address translation capabilities. The proxy agent is configured to receive, from the VoIP server, VoIP streaming data of the virtual meeting. In an example. creating the proxy agent includes associating the proxy agent with the virtual meeting based on the identification information of the virtual meeting, such as the meeting ID.

At block 308, the proxy agent is configured to replicate and transmit the VoIP streaming data to the plurality of client devices associated with respective network devices in the set. Configuring the proxy agent may include loading instructions or functionalities to create copies of the streaming media from the VoIP server and transmitting the same to the respective network devices in the set. Further, in an example, the information of the plurality of client devices participating in the virtual meeting may be updated in real-time.

In response to receiving, from the VoIP server, an indication that the virtual meeting has ended, the network manager terminates the proxy agent in each of the set of network devices. Thus, the proxy agent is dynamically created in the set of network devices and may be removed once the virtual meeting has ended.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Per, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for organizing a virtual meeting over Voice over Internet Protocol (VoIP), comprising:
    receiving, by a network manager from a VoIP server, identification information of the virtual meeting and information of a plurality of client devices connected to the virtual meeting, wherein the network manager manages respective network configurations of a set of network devices in a network and executes on a computing device distinct from the set of network devices;
    associating, by the network manager, a subset of client devices from the plurality of client devices with a network device in the set of network devices based on the identification information of the virtual meeting and respective capabilities of the set of network devices, wherein the network device is coupled to the subset of client devices via a wireless network;
    creating, by the network manager, a proxy agent in the network device, wherein the proxy agent is to receive, from the VoIP server, VoIP streaming data of the virtual meeting; and
    configuring, by the network manager, the proxy agent to:
        replicate the VoIP streaming data for the subset of client devices; and
        transmit the replicated VoIP streaming data to a respective client device via the wireless network while the client device is connected to the virtual meeting.

2. The method of claim 1, wherein the associating the subset of client devices with a network device further comprises:
    selecting the subset of network devices based on a total number of the plurality of client devices and a maximum number of client devices that can connect to the network device; and
    mapping a Media Access Control (MAC) address of each of the subset of the client devices to an Internet Protocol (IP) address of the network device.

3. The method of claim 1, further comprising, sending, by the network manager to the VoIP server, information indicative of the association between the subset of client devices and the network device.

4. The method of claim 1, wherein, creating the proxy agent further comprises associating the proxy agent with the virtual meeting based on the identification information of the virtual meeting.

5. The method of claim 1, further comprising updating in real time, by the network manager, the information of the plurality of client devices connected to the virtual meeting.

6. The method of claim 1, further comprising terminating, by the network manager, the proxy agent in the network device in response to receiving, from the VoIP server, an indication that the virtual meeting has ended.

7. The method of claim 1, wherein the set of network devices is part of a network device cluster.

8. A network manager comprising:
a processor; and
a memory coupled to the processor, the memory storing instructions executable by the processor to:
receive, from a VoIP server, identification information of a virtual meeting and information of a plurality of client devices connected to the virtual meeting, wherein the network manager manages respective network configurations of a set of network devices in a network;
associate a subset of client devices from the plurality of client devices with a network device in the set of network devices based on the identification information of the virtual meeting and respective capabilities of the set of network devices, wherein the network device is coupled to the subset of client devices via a wireless network;
create a proxy agent in the network device, wherein the proxy agent is to receive, from the VoIP server, VoIP streaming data of the virtual meeting; and
configure the proxy agent to:
replicate the VoIP streaming data for the subset of client devices; and
transmit the replicated VoIP streaming data to a respective client device via the wireless network while the client device is connected to the virtual meeting.

9. The network manager of claim 8, wherein to associate the subset of client devices with the network device, the processor is further to:
select the subset of network devices based on a total number of the plurality of client devices and a maximum number of client devices that can connect to the network device; and
map a Media Access Control (MAC) address of each of the subset of the client devices to an Internet Protocol (IP) address of the network device.

10. The network manager of claim 8, wherein the processor is further to send, to the VoIP server, information indicative of the association between the subset of client devices and the network device.

11. The network manager of claim 8, wherein creating the proxy agent further comprises associating the proxy agent with the virtual meeting based on the identification information of the virtual meeting.

12. The network manager of claim 8, wherein the processor is further to update, in real time, the information of the plurality of client devices connected to the virtual meeting.

13. The network manager of claim 8, wherein the processor is further to terminate the proxy agent in the network device in response to receiving, from the VoIP server, an indication that the virtual meeting has ended.

14. The network manager of claim 8, wherein the set of network devices is part of a network device cluster.

15. A non-transitory computer-readable medium comprising computer-readable instructions, the computer-readable instructions when executed by a processor executing a network manager, cause the processor to:
receive, from a VoIP server, identification information of a virtual meeting and information of a plurality of client devices connected to the virtual meeting, wherein the network manager manages respective network configurations of a set of network devices in a network and executes on a computing device distinct from the set of network devices;
associate a subset of client devices from the plurality of client devices with a network device in the set of network devices based on the identification information of the virtual meeting and respective capabilities of the set of network devices, wherein the network device is coupled to the subset of client devices via a wireless network;
create a proxy agent in the network device, wherein the proxy agent is to receive, from the VoIP server, VoIP streaming data of the virtual meeting; and
configure the proxy agent to:
replicate the VoIP streaming data for the subset of client devices; and
transmit the replicated VoIP streaming data to a respective client device via the wireless network while the client device is connected to the virtual meeting.

16. The non-transitory computer-readable medium of claim 15, wherein the computer-readable instructions to associate the subset of client devices with the network device when executed by the processor, further cause the processor to:
select the subset of network devices based on a total number of the plurality of client devices and a maximum number of client devices that can connect to the network device; and
map a Media Access Control (MAC) address of each of the subset of the client devices to an Internet Protocol (IP) address of the network device.

17. The non-transitory computer-readable medium of claim 15, wherein the computer-readable instructions when executed by the processor, further cause the processor to send, to the VoIP server, information indicative of the association between the subset of client devices and the network device.

18. The non-transitory computer-readable medium of claim 15, wherein creating the proxy agent further comprises associating the proxy agent with the virtual meeting based on the identification information of the virtual meeting.

19. The non-transitory computer-readable medium of claim 15, wherein the computer-readable instructions when executed by the processor, further cause the processor to update, in real time, the information of the plurality of client devices connected to the virtual meeting.

20. The non-transitory computer-readable medium of claim 15, wherein the computer-readable instructions when executed by the processor, further cause the processor to terminate the proxy agent in the network device in response to receiving, from the VoIP server, an indication that the virtual meeting has ended.

* * * * *